United States Patent [19]

Vaughan et al.

[11] 4,333,859
[45] Jun. 8, 1982

[54] HIGH SILICA FAUJASITE POLYMORPH - CSZ-3 AND METHOD OF SYNTHESIZING

[75] Inventors: David E. W. Vaughan, Flemington, N.J.; Michael G. Barrett, Severna Park, Md.

[73] Assignee: W. R. Grace & Co., New York, N.Y.

[21] Appl. No.: 201,260

[22] Filed: Oct. 27, 1980

[51] Int. Cl.³ .................. C01B 33/28; B01J 29/08
[52] U.S. Cl. .................. 252/455 Z; 423/328; 423/329; 423/330
[58] Field of Search .................. 423/328; 252/455 Z

[56] References Cited

U.S. PATENT DOCUMENTS 3,639,099  2/1972  Elliott .................. 423/329
3,904,738  9/1975  Robson .................. 423/328

OTHER PUBLICATIONS

Barrer et al., "J. Chem. Soc.", 1953, pp. 4029–4035.
Barrer et al., "J. Chem. Soc.", 1977, pp. 1020–1026.

*Primary Examiner*—Edward J. Meros
*Attorney, Agent, or Firm*—Edward J. Cabic

[57] ABSTRACT

A high silica faujasite structure, CSZ-3, has a composition 0.02 to 0.20 $Cs_2O$: 0.80 to 0.95 $Na_2O$: $Al_2O_3$: 5.0 to 7.0 $SiO_2$: 2-10 $H_2O$ The zeolite has utility in sorption, separation and catalytic applications and it has high hydrothermal stability. It is made by reacting sources of silica, alumina, soda, and cesia together with a nucleating agent in the form of seeds or a seed solution, followed by hot aging at a temperature between 50° and 160° C.

18 Claims, No Drawings

HIGH SILICA FAUJASITE POLYMORPH - CSZ-3 AND METHOD OF SYNTHESIZING

CROSS-REFERENCE TO RELATED APPLICATIONS

U.S. Patent application Ser. No. 6,152,642 filed May 23, 1980 relates to CSZ-1, a new cesium containing zeolite with a larger cesium content.

BACKGROUND OF THE INVENTION

1. Field of the Invention

This invention relates to a new high silica faujasite polymorph containing cesium that can be used for sorption, separation and catalyst applications.

2. Description of the Prior Art

Early zeolite synthesis with cesium, Cs, was reported by Barrer and McCallum in 1953 in *J. Chem. Soc.* (London) page 4029, and subsequent work has been reviewed by Barrer and Sieber in 1977 *J. Chem. Soc.* (Dalton) page 1020, in which they synthesized in Cs-Li-(CH$_3$)$_4$N systems the wide pore zeolites offretite, ZK-5 previously reported by G. T. Kerr in *Inorg. Chem.* 5, page 1539 (1966), and ZSM-2 previously reported by J. Ciric in U.S. Pat. No. 3,411,874 (1968). Robson, in U.S. Pat. No. 3,904,738 (1975), has also reported the synthesis of zeolite Rho in the Na-Cs synthesis system.

The naturally occurring zeolite faujasite has been synthesized to yield products having silica/alumina ratios up to about 5.5 as described in Milton in U.S. Pat. No. 2,882,244; Breck in U.S. Pat. No. 3,130,007; Elliott and McDaniel in U.S. Pat. No. 3,639,099 and Vaughan, Edwards and Barrett in U.S. Pat. No. 4,178,352. Attempts to make faujasite zeolite having ratios greater than this result in very long crystallization times as described by Kacirek and Lechert, J. Phys. Chem., 79, p. 1589, (1975) or required stepwise treatments of low ratio materials with reagents that selectively remove aluminum ions from the faujasite framework as described by Kerr in U.S. Pat. No. 3,493,519 and by Eberly in U.S. Pat. No. 3,506,400, or involve detailed exchange and calcination treatments as described by Maher and McDaniel in U.S. Pat. No. 3,293,192.

OBJECTS OF THE INVENTION

It is an object of this invention to synthesize faujasite structures having a silica to alumina ratio between 5 and 7 with cesium ions trapped in the sodalite cages.

it is still a further object of the invention to economically produce high ration faujasites in shorter periods of time and to suppress the formation of zeolite P impurities.

It is still a further object of the invention to obtain a cesium containing faujasite that has higher hydrothermal stability for sorption, separation and catalyst application.

These and further objects will become apparent as the description of the invention proceeds.

SUMMARY OF THE INVENTION

By using a small level of cesium ions an economic, direct synthesis of a high silica/alumina ration faujasite polymorph is obtained with the additional possibility of trapping a relatively inert large cation within the structure which further modifies the structural and chemical properties such as the acidity. This high silica faujasite polymorph is called CSZ-3.

It has been found that small amounts of cesium ions, when added to seeded faujasite synthesis slurries, facilitate the formation of higher than normal SiO$_2$/Al$_2$O$_3$ ratio products, and suppress the formation of impurity phases. The envisioned synthesis slurries have the composition range: 1.8 to 7.0 Na$_2$O:0.01 to 0.2 Cs$_2$O:Al$_2$O$_3$:6-20 SiO$_2$:90-400 H$_2$O. Seeding has been found to be an essential step in the process.

The products have compositions in the range: 0.80-0.95 Na$_2$O:0.02-0.20 Cs$_2$O:Al$_2$O$_3$:5.0-7.0 SiO$_2$:2-10 H$_2$O. When the product is to be used as a catalyst, it will be exchanged with cations from Groups 2 through 8 of the Periodic Table to remove the undesired excess sodium ions. Even after this ion exchange some cesium ions remain trapped in the sodalite cages of the faujasite structure. Such materials may be expected to have different acid properties than conventional X or Y type faujasites, and to be useful in hydrocarbon processing, separation and adsorption.

DESCRIPTION OF THE SPECIFIC EMBODIMENTS

The cesium ions are relatively large cations that become trapped within the aluminosilicate zeolite structure. At least some of them are so trapped in the cages that they are non-exchangeable when using conventional ion exchange techniques. These trapped cesium ions will affect the acidity of the faujasite and because of their positive ion charge and large size, they permit the formation of the zeolite framework with less aluminum in the framework since the presence of less aluminum is clearly measurable. As a result, the zeolite can have higher SiO$_2$/Al$_2$O$_3$ ratios with ratios as high as 7 being obtained. The higher the SiO$_2$ content, the greater the steam and thermal stability of the resulting zeolite. Such stability is very advantageous when the zeolite is used as a catalyst, since it can be used at higher temperatures and it can withstand more severe regeneration procedures.

Although this CSZ-3 contains cesium as does our earlier filed patent application on our new zeolite CSZ-1, the two products are different. In this case the CSZ-3 is made from a reaction slurry having a relatively low cesium environment to produce a high silica faujasite polymorph which has cesium ions in the sodalite cages. The CSZ-1, on the other hand, is made from a reaction mixture which is higher in cesium content so that the cesium promotes the formation of a new aluminosilicate structure to form a new zeolite structure.

In the preferred practice of our invention, sodium silicate solution is utilized which comprises a solution of sodium silicate having a Na$_2$O/SiO$_2$ ratio of about 0.30 to 0.35 dissolved in water in amounts which range from about 34 to 40 weight percent solids. Sodium silicates having other Na$_2$O/SiO$_2$ ratios can be used, but the above ratio is preferred. An aluminum sulfate solution may be used as a source of Al$_2$O$_3$ and sulfate wherein an aluminum sulfate hydrate having the composition Al$_2$(SO$_4$)$_3$ 13-18 H$_2$O is dissolved in water to produce a solution containing about 4 to 9 percent by weight Al$_2$O$_3$. Another source of Na$_2$O and Al$_2$O$_3$ is sodium aluminate solution which comprises from about 15 to 40 weight percent sodium aluminate, having a composition 1.2 to 1.8 Na$_2$O.Al$_2$O$_3$ dissolved in water. These reactant compositions are optimum in the sense that they are available or readily made in a commercial plant.

In the event a sodium aluminate solution is utilized to provide all the alumina present in the final reaction mixture, a mineral acid such as sulfuric acid, hydrochloric acid or nitric acid solution may be added to provide the desired effective free soda and water level in the final reaction mixture indicated above. It is to be noted that the effective soda level is that quantity of soda which is not neutralized by the presence of inorganic acid. In the reaction mixtures indicated above, the quantity of sodium salt, i.e., $Na_2SO_4$, $NaCl$ or $NaNO_3$ is to be considered inactive insofar as the zeolite synthesis is concerned. In other words, the sodium ion indicated as an acid sodium salt is not used to calculate the critical soda to silicate and soda to alumina ratios required to produce the zeolite.

The cesium which is used in making the CSZ-3 faujasite polymorph can be obtained from many compound sources. For example, any soluble salt such as cesium carbonate, cesium chloride, cesium sulfate or cesium hydroxide can be used. An additional way to obtain the cesium is to treat a mineral containing cesium with an acid which dissolves the mineral and provides the cesium in the resulting liquid. For example, when the mineral pollucite having the formula $CsNaAl_2Si_4O_{12}$ is used, it can be treated with a strong mineral acid such as hydrochloric acid which leaches out the cesium as a soluble salt. Pollucite is also an advantageous mineral to use since it can provide some of the alumina for the zeolite. In addition to using the cesium salt obtained in the filtrate from the acid treatment of the pollucite mineral, it is also possible to use the entire acid reaction mixture including the pollucite residue when making the zeolite. The acid treatment of pollucite technique reduces the overall cost since it does not require an expensive cesium salt as the cesium source. This technique also is beneficial since the acid used in the leaching process can also be used to neutralize the excess $Na_2O$ in the reaction mixture instead of having the alum neutralization step.

Cesium can be added to the reaction mixture by at least two different methods. In one method all the cesium will be added in the initial reaction mixture before any seeds are added. In other words, in this embodiment the seeds used are the ones described above and they do not contain any cesium. In the second method all of the cesium required for the final product can be added from seeds having the composition identified above but which also contain cesium. In addition any combination of these two methods can be used to add the required cesium to the mixture.

Cesium is the only metal having a valence of one that can be used. Although rubidium has a valence of one and there have been suggestions in prior art that rubidium can be used in conjunction with, or substitute for, cesium in the synthesis of other zeolites, our research has shown that in making the present CSZ-3 zeolites, rubidium is not suitable in conjunction with sodium for the crystallization of this pure high silica faujasite polymorph.

One of the preferred embodiments involves the addition of sufficient seeds to provide 6 percent of the total molar alumina in the final product. This relatively large amount of seeds causes rapid zeolite formation and it conforms to conventional manufacturing operations where it is desired to have an excess amount of seeds present so the seed concentration will be adequate throughout the large reactant batch even if complete mixing does not take place. With these excess seeds, however, is the presence of an excess amount of caustic which must be neutralized by some means such as by alum neutralization. If one wishes to reduce the amount of alum neutralizatin that is necessary, it is possible to produce the present faujasite polymorph by using a smaller amount of additional seeds. As one lowers the seeding level homogenization becomes more critical to insure an even distribution of growth centers. Without the proper nucleation sites a competitive impurity, gismondine, may form.

It is also possible to avoid the alum neutralization situation by using metakaolin ($Al_2O_3.2\ SiO_2$). This metakaolin supplies silica and alumina without any $Na_2O$. Another technique that can be used is a mixture of aluminate and metakaolin, where the metakaolin is used in sufficient quantity to eliminate the need for $Na_2O$ neutralization by alum or acid.

If faster crystallization rates are desired, then the CSZ-3 can be synthesized from higher stoichiometry compositions. Such compositions, however, have higher chemical input requirements. For example the reaction rate can be increased about 30 percent by increasing the input ratio of $SiO_2/Al_2O_3$ to 16 from a conventional value of 10. This increase in $SiO_2$, however, will approximately double the input reactants, and increase the $SiO_2$ in the waste liquors.

Seeding or nucleating is a necessary prerequisite for the formation of this new zeolite. Seed compositions having approximate compositions in the range: 4–30 $Na_2O$:1 to 9 $Al_2O_3$:3–30 $SiO_2$:250 to 2000 $H_2O$ may be used for the purposes of this invention. The zeolite forming aluminosilicate seeds, sometimes referred to as zeolite nucleation centers, comprise a reaction mixture of soda, silica, alumina and water in the amounts indicated above. To prepare the slurry of zeolite nucleation centers, appropriate amounts of sodium silicate, sodium aluminate and water are combined and aged for a period of about 1 to 500 hours at a temperature of 0° C. to 90° C. with the shorter time required at higher temperatures.

Preparation of suitable zeolite-forming alumina silicate seeds or nucleation centers is disclosed in U.S. Pat. Nos. 3,639,099 to Elliott et al, 3,808,326 to McDaniel et al and 4,178,352 to Vaughan et al, the disclosure of these three being incorporated herein by reference.

Preferred seed compositions have an approximate composition in the range: 16 $Na_2O$:1 to 9 $Al_2O_3$:15 $SiO_2$:250 to 2000 $H_2O$.

The seeds or nucleation centers are totally consumed in the production of the final zeolites since it is around these particles that the zeolites grow. The amount of seeds to be added is expressed on the basis of the alumina content and it is expressed as a percentage of the total molar alumina content in the final zeolite product produced. Thus in an example where 6 molar percent seeds are added, this means these seeds will be contributing 6% of the total molar amount of alumina in the reacting slurry. A preferred amount of seeds to be added is an amount to yield 0.5 to 8 mole percent of the total final alumina content.

The faujasite polymorph obtained from this cesium synthesis can also be rare earth exchanged to provide superior catalytic properties. When this zeolite is combined with a rare-earth exchanged Y zeolite, the composite catalyst exhibits an increase in high catalytic activity with superior gasoline and coke selective cracking activity.

This new zeolite can also be exchanged with an ammonium solution which after calcination forms a hydrogen exchanged CSZ-3. Use of this form of the zeolite in combination with a rare-earth exchanged Y will result in a significant increase in the percent conversion and the yield of high octane aromatic products such as benzene, toluene and xylene. In addition these materials seem to show an extraordinary activity for polymerizing olefins to aromatics as shown by the relative decrease in the amount of olefins produced as compared to the amount of aromatic materials obtained on cracking.

In addition to exchanging the CSZ-3 faujasite polymorph with rare earths, it can also be substantially exchanged with cations of elements of Groups 2–8 of the Periodic Table to obtain hydrocarbon conversion catalysts. These catalysts can be used alone or in combination with a Y zeolite exchanged with cations of elements of Groups 2–8 of the Periodic Table.

When used in the severe conditions of a hydrocarobn conversion catalyst, it may be used in the above-described forms or may be suitably embedded in an amorphous material such as silica gel, or a cogel of silica and at least one other metal oxide, wherein the metal is selected from Groups II-A, III-A and IV-B of the Periodic Table, e.g. alumina, titania, magnesia, etc. The use of such composite materials may be valuable in fluidized and moving bed operations since they may be readily formed into particles of a desired size. The composites may be formed by incorporating the zeolite crystals into a suitable hydrogel, e.g. silica-alumina hydrogel; subjecting the mixture to high agitation conditions with added water, if necessary, to produce a homogeneous fluid dispersion; and finally spray drying the resulting mixture. One composite catalyst that can be used contains 20–25% of hydrogen exchanged CSZ-3 obtained by exchanging with an ammonium solution followed by heating, 2–5% by weight of calcined rare-earth exchanged Y-zeolite and the remainder an amorphous inorganic oxide matrix.

This zeolite can also be used for its sorptive properties. It is possible to exchange the zeolite with conventional ion-exchanging cations to modify the effective size of the pore openings. The zeolite can be exchanged with cations of elements of Groups 1–8 of the Periodic Table.

EXAMPLE 1

Seed Preparation

This example demonstrates the preparation of the seed slurry necessary to promote crystallization of CSZ-3. A solution of sodium silicate containing 8.9% $Na_2O$, 28.7% $SiO_2$ and weighing 541 g was mixed with 315 ml $H_2O$ in a blender. A sodium aluminate solution was prepared by dissolving 160 g NaOH and 32.5 g $Al_2O_3.3\ H_2O$ in 300 ml $H_2O$. The sodium aluminate solution was then added to the silicate solution while blending vigorously. The resultant clear solution was allowed to stand overnight, by which time a smooth gel had formed. This gel was then used as the seed slurry in the following examples and it had a molar oxide composition of 13.3 $Na_2O:Al_2O_3:12.5\ SiO_2:267\ H_2O$.

EXAMPLE 2

In this example a faujasite according to the present invention is made using as a seed the precursor made in Example 1.

A synthesis slurry having a molar oxide composition of 3.0 $Na_2O:0.1\ Cs_2O:Al_2O_3:10\ SiO_2:200\ H_2O$ was prepared by blending together a solution of 282 g. "N" brand sodium silicate made by Philadelphia Quartz in 240 ml. $H_2O$ with 18.0 g. of the seed precursor from Example 1. To this mixture was added a solution of 9.5 g. NaOH, 4.2 g. CsOH and 13.8 g. $Al_2O_3.3\ H_2O$ in 20 ml. of water. Finally, a 50% solution of $Al_2(SO_4)_3.18\ H_2O$ ws added in the amount of 58.2 g. to form a thick gel. The reaction mixture was transferred to sealed Teflon containers in a controlled temperature oven set at 95° C. The crystallization proceeded for 20 hours, at which time the gel had transformed into pure Na,Cs-faujasite zeolite having the formula 0.95 $Na_2O:0.04\ Cs_2O:Al_2O_3:5.73\ SiO_2$. Since the cation content must equal 1.0, the balance of the cation content is the hydrogen ion, $H^+$, which replaces the sodium lost by hydrolysis during water washing.

EXAMPLE 3

Another mixture was made using the formulation of Example 2 except for changes to produce a higher ratio of silica to alumina. The amount of NaOH was 8.8 g., the amount of $Al_1O_3.3\ H_2O$ was 12.9 g. and the amount of aluminum sulfate solution was 65.8 g. These combined to form a gel with the molar composition of 2.8 $Na_2O:0.1\ Cs_2O:Al_2O_3:10\ SiO_2:200\ H_2O$. After hot aging this mixture for 48 hours at 95° C., the product was pure Na,Cs-faujasite having the formula 0.92 $Na_2O:0.04\ Cs_2O:Al_2O_3:6.0\ SiO_2$. Since the cation content must equal 1.0, the balance of the cation content is the hydrogen ion, $H^+$, which replaces the sodium lost by hydrolysis during water washing.

EXAMPLE 4

In order to further increase the $SiO_2$ content of the faujasite product, another mixture was prepared using the formulation of Example 2, but with 8.1 g. NaOH, 11.9 g. $Al_2O_3.3\ H_2O$ and 73.3 g. aluminum sulfate solution used in place of the quantities given for these three components. The final gel stoichiometry was 2.9 $Na_2O:0.1\ Cs_2O:Al_2O_3:11\ SiO_2:200\ H_2O$. When this was hot aged for 72 at 95° C. it produced a Na,Cs-faujasite product having the formula 0.80 $Na_2O:0.04\ Cs_2O:Al_2O_3:6.2\ SiO_2$. Since the cation content must equal 1.0, the balance of the cation content is the hydrogen ion, $H^+$, which replaces the sodium lost by hydrolysis during water washing.

EXAMPLE 5

To improve the reaction rate, a higher stoichiometry was employed. A synthesis slurry ratio of 6.4 $Na_2O:0.1\ Cs_2O:Al_2O_3:16\ SiO_2:300\ H_2O$ was made by combining 303 g. "N" brand silicate with 12 g. seed slurry and 270 ml. $H_2O$ in a blender. To this was added a Na,Cs aluminate prepared by dissolving 14.2 g. $Al_2O_3.3\ H_2O$ in a solution of 10.6 g. NaOH and 2.8 g. CsOH in 20 ml. $H_2O$. This mixture was heated for 20 hours at 95° C., at which time, a Na,Cs-faujasite product was obtained having the formula 0.95 $Na_2O:0.03\ Cs_2O:Al_2O_3:5.1\ SiO_2$. Since the cation content must equal 1.0, the balance of the cation content is the hydrogen, ion, $H^+$, which replaces the sodim lost by hydrolysis during water washing.

EXAMPLE 6

To evaulate the relative effectiveness of rubidium, compared to cesium in the synthesis of an impurity-free faujasite zeolite, a gel was made according to the composition of Example 2, except for direct substitution of 2.8 g. of rubidium for the CsOH used. Na,Rb-faujasite was formed only in moderate quantities after 24 hours of hot aging and by 48 hours was contaminated with approximately 20% Na,Rb-zeolite M as described by R. M. Barrer et al, *J. Chem. Soc.*, p. 2882 (1956) and in the Breck, U.S. Pat. No. 3,012,853, which co-crystallized readily to the extent of 50% faujasite and 50% zeolite M in 6 days.

EXAMPLE 7

To further test the effect of the rubidium ion in promoting zeolite M impurity growth, a gel composition of 3.0 $Na_2O$:0.2 $Rb_2O$:$Al_2O_3$:10 $SiO_2$:200 $H_2O$ was used. After hot aging for 48 hours at a temperature of about 95° C., the reaction mixture was 50% Na,Rb-faujasite contaminated with 50% Rb-zeolite M. This, and the preceding example show that rubidium is ineffective in producing a pure faujasite with the desirable properties as is obtainable when the slurry is crystallized with cesium.

EXAMPLE 8

The products from Examples 2-4 were used to make fluid cracking catalysts as follows.

Each promoter was exchanged three times in 10% $(NH_4)_2SO_4$ at 100° C. for ½ hour with intermediate washing with deionized water and filtration. The products were then calcined in a 1200° F. steam atmosphere and given three additional exchanges as outlined above.

One half of each promoter was blended with an amorphous semi-synthetic matrix of gel and clay. The matrix was made by mixing 30 parts of clay and 70 parts of a silica gel which contains 25 weight % alumina and 75% silica. The first half of the promoter was added to the matrix in the amount of 10% promoter and the product was calcined for 1 hour at 1000° F. In the Table 1 below the conversion results along with $C_6$ olefin evaluation (which is a measure of octane) and aromatic yields are set forth. They demonstrate the increase in conversion with higher $SiO_2/Al_2O_3$ ratios for the fresh catalyst without significantly decreasing the octane quality of the product gasoline.

TABLE 1

| Example | $SiO_2/Al_2O_3$ Ratio | Final % $Na_2O$ | Catalytic Activity Results 10% Promoter/1000° F. | | |
|---|---|---|---|---|---|
| | | | % Conv. | $C_6^=$ | Aromatics |
| 8-1 | 5.7 | 0.075 | 66 | 17.4 | 31.7 |
| 8-2 | 6.0 | 0.093 | 70 | 15.4 | 29.4 |
| 8-3 | 6.2 | 0.069 | 67 | 16.6 | 30.1 |

Microactivity test data at 900° F., 16 WHSV and 3 C/O. F. G. Ciapetta and D. S Henderson, *Oil & Gas J.* p. 88 (10/16/67).

The other half of the prepared promoter was blended in the same matrix at a 25% level, then further treated with 100% steam at 1350° F. for 8 hours to simulate the hydrothermal deactivation that a catalyst is subjected to when it is regenerated over many cycles. This procedure is described by Magee and Blazek in "Zeolite Cracking Catalysts" in Zeolite Chemistry and Catalysis edited by Jule A. Robo, ACS Monograph 171 (1976). In the Table 2 below the conversion results along with $C_6$ olefin evaluation (which is a measure of octane) and aromatic yields are set forth. They again demonstrate the increase in conversion with higher $SiO_2/Al_2O_3$ ratios for the aged catalyst without significantly decreasing the octane quality of the product gasoline. They also demonstrate that since the higher ratio materials have a large conversion percentage, these materials are more hydrothermally stable, demonstrating major benefits for CSZ-3 catalyst compositions.

TABLE II

| Example | $SiO_2/Al_2O_3$ Ratio | Final % $Na_2O$ | Catalytic Activity Results 25% Promoter/S-13.5 Steam | | |
|---|---|---|---|---|---|
| | | | % Conv. | $C_6^=$ | Aromatics |
| 8-1 | 5.7 | 0.075 | 69 | 17.5 | 18.0 |
| 8-2 | 6.0 | 0.093 | 72 | 17.3 | 16.5 |
| 8-3 | 6.2 | 0.069 | 78 | 15.1 | 19.4 |

Microactivity test data at 900° F., 16 WHSV and 3C/O. F. G. Ciapetta and D. S. Henderson, *Oil and Gas J.* p. 88 (10/16/67).

What is claimed is:

1. A high silica faujasite aluminosilicate having a silica to alumina ratio of between 5.0 and 7.0 and having cesium ions trapped in the sodalite cages.

2. A high silica faujasite aluminosilicate according to claim 1, having a formula in terms of mole ratios of oxides as follows: 0.80-0.95 $Na_2O$:0.02-0.20 $Cs_2O$:$Al_2O_3$:5.0-7.0 $SiO_2$:2-10 $H_2O$.

3. A hydrogen exchanged high silica faujasite aluminosilicate produced by exchanging the faujasite aluminosilicate of claim 1 with an ammonium solution followed by heating so as to increase the hydrogen ion content.

4. A composite hydrocarbon conversion catalyst consisting of a mixture of the hydrogen exchanged faujasite aluminosilicate according to claim 3, and an amorphous inorganic oxide matrix.

5. A catalyst according to claim 4, wherein the amorphous matrix is a semi-synthetic mixture of silica-alumina gel and clay.

6. A hydrocarbon conversion catalyst made by substantially exchanging the product of claim 4 with elements of Group 2-8 of the Periodic Table.

7. A composite catalyst comprising the product of claim 6 combined with a Y-faujasite zeolite exchanged with cations of elements of Groups 2-8 of the Periodic Table.

8. A catalyst comprising about 20-25% of the hydrogen exchanged high silica faujasite aluminosilicate of claim 3, an amorphous inorganic oxide matrix, and a matrix containing about 2-5% by weight of calcined rare-earth exchanged Y-zeolite.

9. Sorbent compositions comprising an exchanged faujasite aluminosilicate produced by exchanging the high silica faujasite aluminosilicate of claim 2 with cations of elements of Groups 1-8 of the Periodic Table, and with or without a binder comprising clay and/or amorphous inorganic gel.

10. A method for preparing the high silica faujasite aluminosilicate as defined in claim 1, which comprises
   (a) preparing a mixture containing sources of cesia, an oxide of sodium, an oxide of silicon, an oxide of aluminum, water and sodium aluminosilicate nucleating seeds, said mixture having a final composition in terms of mole ratios of oxides within the following ranges: 1.8 to 7.0 $Na_2O$:0.02 to 0.2 $Cs_2O$:$Al_2O_3$:6-20 $SiO_2$:90-400 $H_2O$ said seeds being present in an amount to yield 0.1 to 25 mole percent of the total final alumina content,
   (b) mixing the composition of step (a) to obtain a homogeneous reaction mixture which forms a gel, and
   (c) heating the resulting gel at a temperature over 50° C. unitl crystals are formed.

11. The method according to claim 10, wherein the temperature in the heating step is maintained between over 50° C. and 160° C.

12. The method according to claim 10, wherein the amount of reactants is controlled to obtain a final composition in the following ranges: 0.80-0.95 $Na_2O$:0.02-0.20 $Cs_2O$:$Al_2O_3$:5.0-7.0 $SiO_2$:2-10 $H_2O$.

13. The method according to claim 10, wherein the seeds have a composition in terms of mole ratios of oxides of about 16 $Na_2O$:1-9 $Al_2O_3$:15 $SiO_2$:250-2000 $H_2O$.

14. The method according to claim 10, wherein the source of cesia added in step (a) is in the nucleating seeds.

15. The method according to claim 10, wherein at least some of the cesium is obtained by acid treatment of the mineral pollucite.

16. The method according to claim 10, wherein the seeds are present in an amount to yield 0.5 to 8 mole percent of the total final alumina content.

17. The method according to claim 10, further comprising adding alum to neutralize excess caustic provided by the seeds.

18. The method according to claim 10, further comprising adding metakaolin as a source of silica and alumina.

* * * * *